United States Patent [19]

Wilson

[11] Patent Number: 5,118,527
[45] Date of Patent: Jun. 2, 1992

[54] DRY GROUT AND METHOD OF DISTRIBUTION ALUMINUM THEREIN

[76] Inventor: Alfonzo L. Wilson, 3661 Langton Rd., Cleveland Heights, Ohio 44121

[21] Appl. No.: 620,148

[22] Filed: Nov. 30, 1990

Related U.S. Application Data

[63] Continuation of Ser. No. 104,226, Oct. 5, 1987.

[51] Int. Cl.$^5$ .......................... B05D 7/14; B32B 5/16
[52] U.S. Cl. .................... 427/204; 427/205; 427/216; 106/403; 106/404; 106/641; 106/814; 428/403; 428/404; 428/406
[58] Field of Search ............... 427/216, 203, 204, 205; 106/403, 404, 641, 814; 428/403, 404, 406

[56] References Cited

U.S. PATENT DOCUMENTS 2,835,602  5/1958  Benner .
3,649,317  3/1972  Houseknecht ..................... 106/657
4,621,024  11/1986  Wright ............................... 428/404

Primary Examiner—William R. Dixon, Jr.
Assistant Examiner—Anthony J. Green

[57] ABSTRACT

A method of packaging dry grout involving a novel aluminum product for use in packaged dry grout. Aluminum flakes conventionally used as an expanding agent in a grout fluidifier are coated with a film which has limited sensitivity to the moisture and the alkali (cement) in dry grout and are then blended with the materials (comprising cement) to be packaged as a dry grout for mixing with water to form a wet grout. The coating used is highly sensitive to the water and/or alkaline nature of the wet grout and readily deteriorates when the dry grout is mixed with water. A coating and binder, e.g., sodium silicate, may be used to coat the aluminum flakes and to adhere the aluminum to microparticles, such as glassy microspheres, prior to a dry grout blending operation.

9 Claims, No Drawings

DRY GROUT AND METHOD OF DISTRIBUTION ALUMINUM THEREIN

This application is a continuation of my earlier filed co-pending application Ser. No. 104,226, filed Oct. 5, 1987.

The present invention relates to grouting utilizing cementitious material, or materials, finely divided aluminum powder and water, without or with fine aggregate or admixtures, to produce a pumpable wet grout, and, more particularly, to a packaged blended dry grout comprising cementitious material, such as cement, blended together with protected aluminum flakes, with or without other materials such as sand, and to the type of aluminum flake product used therein.

Various practices have been previously used to introduce finely divided aluminum into a wet grout. The aluminum particles react with the alkaline water of the wet group to function as an expanding agent for the grout.

One such previous practice has been to mix at the jobsite about 3 to 5 grams of commercially available polished aluminum powder, such as leafing flakes used as pigments for paints, with about fifty lbs. of cement at the jobsite (to achieve dispersion); then this was added to more cement, and usually other materials, plus water to obtain a pumpable or pourable grout. This procedure is frowned upon in practice in that it is difficult to obtain the correct proportions and dispersion of the aluminum flakes. One known abortive effort to factory package blended aluminum flakes as commercially available and cement for mixing with water at the jobsite was given up within a matter of weeks because of the reaction of aluminum flakes in the package caused by the presence of the cement and the moisture in the blended dry mix.

Grout fluidifiers to be mixed at the jobsite with cement, water, and perhaps other materials, have involved the factory blending of the aluminum flakes with a non-alkaline powder, such as fly ash or limestone dust and/or other grout property-enhancing materials, with the blended materials being packaged in accurate amounts by weight for use with a stated quantity of cementitious materials at the jobsite.

Also, a prior and continuing commercial practice, is based on U.S. Pat. Nos. 3,197,323 and 3,579,366 to Solomon J. Rehar, involving preparing a dry grout including a cementitious material (frequently a portland cement), a fluidifier comprising commercially available polished 100 mesh aggregate (sand in common practice), and packaging the blend for storage and shipment to a construction site where it is mixed with water to form a pumpable wet grout for use in filling a construction form or other space to form a hardened grout structure. Before the aluminum flakes are blended with the cement of the dry grout, they are encapsulated in a methyl cellulose matrix to protect them against reacting because of the alkali nature of the dry blend caused by the presence of the cement and the relatively small moisture content of the dry grout. Methyl cellulose is a non-alkaline sensitive material and does not form a film coating which adheres to the flakes. In this known practice, agglomerates or granules of encapsulated aluminum flakes are formed. Flakes on the outside periphery of the agglomerate are not adhered or protected by a coating and are lost.

When methyl cellulose is used to encapsulate the aluminum leafing type powder, the methyl cellulose is baked after the agglomerate is formed to drive out the solvent for the methyl cellulose. When the solvent is driven off, the methyl cellulose frequently forms a hard matrix about the encapsulated aluminum and it is difficult for the water of a wet grout to penetrate the methyl cellulose coating so that it can react properly with the aluminum flakes. To address this problem, the matrix has been made porous. See U.S. Pat. Nos. 3,579,366 and 3,709,707.

Agglomerates of aluminum flakes and methyl cellulose, are of a relatively large size (from about 300 microns to 1700 microns), each usually involving a relatively large number of flakes. This has caused concentration of the aluminum in the grout at the discrete locations of the agglomerates and the failure to secure a sufficient distribution of the aluminum in the grout. Accordingly, the agglomerates should be mechanically broken up when the dry grout is mixed with water to form a wet grout for pouring or pumping so that the necessary number of individual particles for the proper distribution of the aluminum flakes throughout the grout are present, as well as to facilitate penetration by the water of the wet grout into the particle to the aluminum. The necessity to breakup the agglomerates is a problem but also disadvantageously increases the mixing time for the wet grout.

When mixing the dry grout with water to form a wet grout, the agglomerates, if not broken up into smaller particles to provide the proper distribution of aluminum throughout the grout, will cause the aluminum in the wet grout to be too concentrated at the locations of the agglomerates and the aluminum will not properly function as an expanding agent. Accordingly, high speed propeller type mixers are recommended, and normally used, for mixing the dry grout with water to form the wet grout. The action of such mixers and the abrasion caused by the mixing will break up the agglomerates sufficiently to provide, i.e., a dispersion substantially free of the aluminum concentrations mentioned above in this paragraph the proper aluminum dispersion and dissolution of the methyl cellulose prior to the pumping of the grout. It is appreciated by those in the art that when the agglomerates are mixed into the water of the wet grout and are broken up by the mixing, the aluminum flakes will start to react (i.e., gas) with the rate of reaction depending on the alkalinity of the wet grout, temperature, and the size of the aluminum flakes. Conventionally the reaction takes place over a period of 2 to 3 and sometimes 4 or 5 hours during the pumping and setting of the grout.

The relatively large size of the known agglomerates also presents problems when bags of the dry grout are sampled for testing to see if the constituents of the dry grout are within limits. In practice, the bags of dry grout are sampled at the construction location before mixing the dry grout to form a wet grout for pumping. The size of the presently used agglomerates limit the number locations in the dry grout for the aluminum content. The concentration of aluminum flakes in agglomerates results in a relatively limited number of agglomerates and makes it possible to obtain test samples from a bag that will not test within the required limits for the aluminum content even though the bag, as a whole, is within limits and would function properly when mixed properly to form a slurry.

In the known commercial practice of encapsulating aluminum flakes, methyl cellulose has been used as a coating and binder for the aluminum flakes because of its relative insensitivity to the alkali nature and moisture content of dry mix. Aluminum flakes which are commercially available will, as supplied, react in a dry grout blend including cement. While the flakes have a stearate coating for preventing oxidation of aluminum, the stearate coating applied to the aluminum flakes in commercial practice is not effective to protect the aluminum flakes against deterioration during the normal storing and shipping periods of a dry grout. It is believed that the primary reason for this is that the stearate coating is not durable enough to survive the dry grout blending operation which is abrasive because of the presence of cement, and perhaps other solids. However, it is questionable that the thin stearate coating of leafing flakes would survive the alkalinity and moisture of a packaged dry grout including cement even if the coating were not abraded by the blending operation.

In the practice of the invention, a film type coating which adheres to the aluminum flakes is used with the film having sufficient resistance to abrasion to survive normal dry grout blending with cement. The coating while having a limited sensitivity to the alkaline nature and moisture of the dry grout, has a high sensitivity to the alkaline water of the wet grout (the alkalinity being caused by the presence of cement) so as to cause the film coating on the aluminum flakes to break down (or dissolve) and expose the aluminum to the water of the wet grout to obtain the necessary reaction for the aluminum to function as an expanding agent. One such alkaline water sensitive coating and binder is water glass (sodium silicate). Other coatings and binders of similar characteristics may be utilized. For example, the coating and/or binder may be neutral to an alkaline environment but highly soluble in water, if it has limited sensitivity to the moisture and alkalinity of the dry grout.

Accordingly, in the invention, the aluminum used in the grout is coated with a film forming material, e.g., sodium silicate, which forms a film that coats and adheres to the aluminum with the coating being sensitive to the water and/or the alkaline nature of a wet grout but which also has a sufficiently limited sensitivity to the alkaline nature and moisture of dry grout including cement and the abrasive nature of the dry grout blending operation so that it is able to protect the aluminum flakes for commercially acceptable time periods for storage and/or shipping.

In the preferred embodiment of the present invention, the aluminum flakes, before being blended into dry grout materials, are film coated and adhered to small micro-particles, e.g., commercially available glassy silica microspheres, by use of a film forming coating and binder. The invention, however, contemplates that the particles of finely divided aluminum may be individually provided with a proper film coating, e.g., during the manufacture of the aluminum and mixed into the dry grout without adhering them to another particle.

In accordance with the preferred embodiment utilizing micro-particles, aluminum flakes and small glassy micro-particles are coated with a film binder which also adheres the flakes to the small glassy particles. The size of the glassy particles is such that the coated glassy particles are sufficient in number for the required quantity of finely divided aluminum to provide a sufficient distribution of aluminum in the grout so that a significant releasing or breaking off, and disbursement of, the aluminum from the micro-particles by mechanical action or otherwise is not required for the proper functioning of, this necessarily includes a proper distribution of the aluminum flakes without concentrations of the flakes as mentioned above in discussing the prior art the aluminum as an expanding agent for the grout. Preferably, the micro-particles have a maximum size of about 350 to 400 microns with the average size as determined by weight preferably being about 100 microns.

Tests have shown that the sodium silicate film coating for protecting the flakes will not be detrimentally affected by the dry grout blending or the alkalinity and moisture content of the dry grout for time periods commercially acceptable for the storage and shipping of the dry grout. While sodium silicate has been used as a coating, it will be appreciated that other coatings or binders which are sensitive to the water of the wet grout but have limited sensitivity to that of the moisture content and the alkalinity of the dry grout and are abrasion resistant to the blending with cementitious materials may be used.

In practice, the smaller the average size of the micro-particles utilized, the greater the number of discrete aluminum coated particles involved for a given quantity of aluminum, and the more the number of distribution points for the aluminum up to a one to one correspondence in the number of coated particles and the number of aluminum flakes.

In tests, I have used a commercially available grade of glassy silica microspheres having particle sizes from about 10 to about 350 microns with about 20% of the particles having particle sizes of between about 125 and 350 microns and about 65% between about 50 and 125 microns. Other grades of micro particle may also be used to provide a sufficient number of individual coated particles for a given quantity of aluminum. The particle size used is not critical as long as a sufficient number of coated particles are present to provide the desired number of distribution points for the aluminum. However at the present I prefer a maximum size of 400 microns.

The aluminum flakes may be adhered to a micro-particle by the use of various conventional methods for coating microspheres or other small particles with metal particles or flakes. In the process which I have used, microspheres and the aluminum powder are dry blended to provide a uniform mix of the powder and microspheres, with the mix then being spread on a flat surface to form a thin layer. Droplets of a sodium silicate solution are then applied by dropping the droplets onto the whole of the entire layer to evenly spread the solution over the entire layer. The microspheres in the mixture are then rolled laterally in a mixing fashion to pick up and coat the flakes and adhere them to the microspheres. In the process of rolling, the water glass forms a film on the aluminum flakes and microspheres and the aluminum flakes become adhered to the microspheres. In coating the aluminum and adhering the aluminum to the microspheres, the microspheres do not tend to agglomerate but essentially retain their individual identity and the size and number of the microspheres as well as the film coating combine to limit the number of flakes which can adhere to an individual microsphere.

A preferred recipe for forming individual aluminum coated micro-spheres is as follows:

| Material | % by Wght. |
| --- | --- |
| Aluminum leafing powder Alcoa No. 322, 100 mesh polished | 3 |

-continued

| Material | % by Wght. |
| --- | --- |
| Hollow glass spheres size: 10-350 microns; particle size: 25% above 125 microns by weight, 65% between 49 and 126 microns by weight; bulk density: 25 lbs per cubic foot; average size by weight: 100 microns. | 83 |
| 40° Baume sodium silicate solution (50% water) | 14 |

The coated particles are prepared by the described method, baked briefly, e.g., for five minutes, at a temperature of about 130° F., and then air dried to complete the drying of the sodium silicate to harden or set the sodium silicate binder.

I contemplate that the distribution of aluminum may also be accomplished by coating the aluminum flakes with a first alkaline water sensitive coating, and then adhering the coated aluminum flakes to micro-particles with another coating and/or binder which will readily disintegrate in the wet grout to release the aluminum flakes from the particles for further dispersion during the wet grout mixing and pumping operation or for a faster reaction in the wet grout. The binder adhering the coated flakes to the micro-particles may also be soluble or otherwise disintegrate in the presence of the moisture and/or the alkalinity of the cementitious dry grout so as to release the bond between the coated aluminum flakes and the micro-particles after being blended therewith. It will be appreciated that the binder for adhering the coated flakes to the micro-particles may deteriorate while in the dry mix without adverse results if the coating for the flakes is sufficient to protect the flakes from the moisture and alkalinity of dry grout with cement.

It will be further appreciated that the quantity of coated microspheres used for a given quantity of aluminum will depend on the number of aluminum flakes which are adhered to the individual microsphere. The number of flakes on a particle is, in turn, dependent on the size of the micro-particle. If the number of coated micro-particles is determined to be too few to provide the desired number of distribution points, a finer grade of particles may be used in the coating process.

Conventionally in the art of grouting, a fluidifier (which is an admixture of grout enhancing materials) is utilized in the grout recipe and contains the coated aluminum flakes as a component thereof. The admixture will normally constitute, for example, about one percent by weight of the cementitious material in the dry grout. A typical wet grout may contain, by weight (lbs.),

| Cement | 282 |
| --- | --- |
| Fly Ash | 70 |
| Sand | 360 |
| Water | 167 |
| Fluidifier | 3.52 |

The quantity of coated micro-particles needed to provide the necessary aluminum content may be determined by first reacting a given unit quantity of coated micro-particles in an alkaline grout slurry and measuring the gas produced. Knowing this, one of ordinary skill in the art may determine the quantity of coated microsphere units necessary to produce the total gas volume required for the grout.

A simple method of determining the total gas volume required is to mix a unit of the quantity of aluminum flakes required into a solution of sodium hydroxide and measure the gas volume released to determine the gas generated for the unit quantity. Knowing this, the total gas volume for the whole quantity of aluminum to be used can be readily computed as well as the necessary quantity of coated microspheres to produce the total gas quantity since the gas volume for a unit quantity of the coated microspheres has been determined, or is determinable, as described above.

Whether there is a sufficient number of particles for the aluminum to effect the proper distribution of the aluminum can be determined, as is appreciated by those in the art, by examination of a sample of hard grout made from a test batch of the dry grout. If a wider distribution is necessary, this can be accomplished by using a finer grade of coated micro-particles which will have, on the average, a lesser number of aluminum flakes on the micro-particles, on the average. If more or less aluminum is required, the number of coated particles can be increased or decreased to adjust the aluminum content.

One of ordinary skill in the pertinent art, from the above description of the invention and of the preferred embodiments, may readily determine when there are sufficient flake carrying micro-particles to effect the distribution of the aluminum to achieve the proper action of the aluminum in expanding the grout. For example: Those of ordinary skill in the art know how to determine the quantity of aluminum flakes to be used in a grout recipe to provide the desired expansion. Conventionally this may be determined by preparing a laboratory sample of the grout with an approximated amount of aluminum flakes, e.g., under a known guideline of about one teaspoon of aluminum per bag of cement (94 lbs.), measuring the expansion of the sample wet grout, and adjusting the aluminum flakes if necessary on a trial and error basis until the desired expansion is achieved for that recipe. The industry presently has conventional grout recipes which use aluminum flakes and these can also be used as the guidelines for the quantity of aluminum flakes to be carried by the microspheres. The above specification further indicates that the microspheres should be of a grade having a maximum size of about 350 to 400 microns preferably with an average size by weight of about 100 microns. Moreover, for hollow microspheres of the preferred recipe, the weight of the hollow microspheres is about 28 (83/3) times the aluminum flakes. It is within the ordinary skill in the art to adjust for heavier or lighter microparticles than the hollow microspheres of the preferred embodiment. As described, the microspheres are first preblended with the aluminum flakes and the binder then applied to coat and adhere the flakes to the microspheres. Also as described above, after the coated flake carrying microspheres are dried, the gas generated by a unit quantity of the microspheres can be determined and compared with that from a unit quantity of aluminum flakes to ascertain the equivalent quantity of coated flake carrying microspheres to be used in a grout mix in place of the conventional aluminum flake expansion agent. Conventional test samples of the grout recipe with the flake carrying microspheres may then be made, cross sectioned, and inspected, in accordance with conventional practice, to see if the aluminum flakes are too concentrated in some areas. This is usually revealed, as is known to those in the art, by relatively large pockets in the faces of the cross-section which may be seen with the naked eye or with a hand glass. If such pockets are present, this indicates that the number of micro-particles for the same quantity of the aluminum flakes is to be increased and one working in the art would understand from the foregoing specification to blend a larger quantity of microspheres with the same quantity of aluminum flakes. This may be done by adding more of the same grade size microspheres to reduce the flakes on a single particle or changing the grade size. Known petrographic techniques are also conventionally used in the examination of grout cross-sections and are available to determine if the proper number of flake carrying microspheres have been used to effect proper distribution of the flakes.

What I claim is:

1. A method for preparing aluminum flakes for distribution in alkaline cement wet and dry grouts used for forming cementitious structures, said cement dry grouts having a relatively low alkalinity relative to said cement wet grouts, the aluminum flakes to be dispersed throughout a grout for forming cementitious structures for effectively expanding the grout for the structure being formed, said method comprising the steps of (1) providing aluminum flakes for dispersion throughout a grout, (2) providing inert individual microparticles for carrying said flakes to disperse said flakes throughout the grout with the microparticles having a maximum size up to 400 microns and being sized to limit the number of flakes attached to the respective microparticles to provide a number of sized microparticles for carrying the flakes to effect the dispersion of the flakes throughout the grout substantially free of aluminum concentration, the microparticles having up to a one to one correspondence with the flakes, (3) blending said aluminum flakes with said microparticles, (4) mixing said blended aluminum flakes and microparticles with a hardenable adhesive binder to form a unitary binder coating on said flakes and microparticles to adhere said aluminum flakes to the microparticles to coat the aluminum flakes with a coating for protecting the flakes from relatively low alkaline cement grout environments, and (5) hardening said coatings, said hardened coatings having a durability to survive blending into a dry cement grout and being relatively insensitive to the alkalinity in dry grout but dissolvable in the alkalinity of a wet cement grout to expose the aluminum flakes.

2. A method of preparing a particulate aluminum flake expanding agent comprising aluminum flakes as defined in claim 1 wherein sodium silicate is used to coat and adhere said flakes to the micro-particles.

3. A method of preparing a particulate aluminum flake expanding agent as defined in claim 1 wherein said micro-particles are glassy microspheres.

4. A method of preparing a particulate aluminum flake expanding agent as defined in claim 3 wherein said microparticles have a maximum size of from about 350 microns to about 400 microns and the average size as determined by weight is about 100 microns.

5. A method of preparing a particulate aluminum flake expanding agent comprising aluminum flakes as defined in claim 4 wherein sodium silicate is used to form said unitary coatings attaching said flakes to said microspheres, and said microspheres are hollow glassy microspheres having a total weight approximately 28 times the weight of the attached aluminum flakes.

6. A method as defined in claim 5 in which said blend of aluminum flakes and microspheres is distributed to form a generally horizontal layer, and said adhesive is applied over said layer and the microspheres are then rolled laterally to mix the aluminum flakes and microspheres with the sodium silicate to adhere said flakes to the microspheres and to fully coat said flakes.

7. A method as defined in claim 1 in which said blend of aluminum flakes and microspheres is distributed to form a generally horizontal layer, and said adhesive is applied over said layer and the microspheres are then rolled laterally to mix the aluminum flakes and microspheres with the hardenable binder to adhere said flakes to the microspheres and fully coat said flakes.

8. A method as defined in claim 1 in which said micro-particles have a maximum size of from about 350 microns to about 400 microns, and an average size as determined by weight of about 100 microns.

9. A method for preparing aluminum flakes for dispersion throughout an alkaline cement grout for forming a cementitious structure, the aluminum flakes to be dispersed throughout the grout substantially free of aluminum concentration to effectively expand cementitious structures being formed with the grout, said method comprising the steps of (1) providing aluminum flakes for dispersion throughout the grout to effectively expand the grout, (2) providing inert individual microparticles for carrying said flakes to be dispersed throughout the grout with the microparticles having a maximum size up to 400 microns and being sized to provide a number of carrier microparticles to which said flakes are to be attached to limit the number of flakes attached to the respective microparticles to provide a number of sized microparticles for effecting the dispersion thereof in the grout substantially free of aluminum concentration, the microparticles having up to a one to one correspondence with the flakes, (3) blending said aluminum flakes with said microparticles, (4) mixing said blended aluminum flakes and microparticles with a hardenable adhesive binder to form a unitary binder coating on said flakes and microparticles to adhere said aluminum flakes to the microparticles to coat the aluminum flakes with a coating for protecting the flakes, and (5) hardening said coatings, said hardened coatings having a durability to survive mixing with cement and dissolvable in the alkalinity of a wet cement grout to expose the aluminum flakes.

* * * * *